(12) United States Patent  (10) Patent No.: US 7,599,713 B2
Walters et al.  (45) Date of Patent: Oct. 6, 2009

(54) MOBILE TERMINAL WITH REDUCED COMPONENTS

(75) Inventors: Eckhard Walters, Roethenbach (DE); Andreas Bening, Roethenbach/Peg. (DE)

(73) Assignee: NXP B.V., Eindhoven (NL)

( * ) Notice: Subject to any disclaimer, the term of this patent is extended or adjusted under 35 U.S.C. 154(b) by 321 days.

(21) Appl. No.: 10/591,970

(22) PCT Filed: Mar. 3, 2005

(86) PCT No.: PCT/IB2005/050782

§ 371 (c)(1),
(2), (4) Date: Sep. 7, 2006

(87) PCT Pub. No.: WO2005/088997

PCT Pub. Date: Sep. 22, 2005

(65) Prior Publication Data

US 2007/0178937 A1  Aug. 2, 2007

(30) Foreign Application Priority Data

Mar. 10, 2004  (EP) .................................. 04100987

(51) Int. Cl.
*H04B 1/38* (2006.01)
*H04M 1/00* (2006.01)
(52) U.S. Cl. ..................... 455/558; 455/550.1; 455/425
(58) Field of Classification Search .................. 455/557, 455/558, 552.1, 553.1, 84, 410
See application file for complete search history.

(56) References Cited

U.S. PATENT DOCUMENTS

| 5,581,803 | A | * | 12/1996 | Grube et al. ............... 340/7.41 |
| 5,748,720 | A | * | 5/1998 | Loder .......................... 455/406 |
| 5,854,976 | A | * | 12/1998 | Garcia Aguilera et al. .. 455/411 |
| 5,870,459 | A | * | 2/1999 | Phillips et al. ............... 455/409 |
| 5,875,393 | A | * | 2/1999 | Altschul et al. ............. 455/407 |
| 5,896,507 | A | | 4/1999 | Martineau et al. |
| 5,915,226 | A | * | 6/1999 | Martineau ................... 455/558 |
| 6,014,561 | A | * | 1/2000 | Molne ......................... 455/419 |
| 6,035,189 | A | * | 3/2000 | Ali-Vehmas et al. ...... 455/414.1 |
| 6,112,077 | A | * | 8/2000 | Spitaletta et al. ............ 455/407 |
| 6,188,898 | B1 | * | 2/2001 | Phillips ....................... 455/433 |
| 6,192,436 | B1 | * | 2/2001 | Jacobson et al. ............ 710/104 |
| 6,199,158 | B1 | * | 3/2001 | Hirsch .......................... 713/1 |
| 6,415,144 | B1 | * | 7/2002 | Findikli et al. .............. 455/419 |
| 6,480,725 | B2 | * | 11/2002 | Cassidy et al. .............. 455/558 |
| 6,602,096 | B1 | * | 8/2003 | Kronestedt et al. .......... 439/630 |
| 6,636,747 | B2 | * | 10/2003 | Harada et al. ............ 455/552.1 |
| 6,816,738 | B2 | * | 11/2004 | Posey ...................... 455/550.1 |

(Continued)

FOREIGN PATENT DOCUMENTS

WO  WO 01/89245  11/2001

*Primary Examiner*—Duc M Nguyen
(74) *Attorney, Agent, or Firm*—Eric M. Ringer; Seed IP Law Group PLLC

(57) ABSTRACT

The invention relates to a mobile terminal (20, 30) having a first processing unit (7), a first memory device (21) and SIM card chip (23) including a second memory device (22), the second memory device (22) is reprogrammable. To provide a low price mobile terminal having reduced components and costs and less power consumption the first memory device (21) includes terminal independent data stored in the first memory device (21) before manufacturing of the mobile terminal (20, 30), and individual mobile terminal specific data are stored in the second memory device (22) after manufacturing of the mobile terminal (20, 30).

17 Claims, 2 Drawing Sheets

U.S. PATENT DOCUMENTS

| | | | |
|---|---|---|---|
| 7,277,701 B2 * | 10/2007 | Almgren | 455/432.2 |
| 2003/0066881 A1 | 4/2003 | Maenpaa et al. | |
| 2004/0176092 A1 * | 9/2004 | Heutschi | 455/435.1 |
| 2004/0203863 A1 * | 10/2004 | Huomo | 455/456.1 |
| 2005/0250468 A1 * | 11/2005 | Lu et al. | 455/403 |
| 2007/0093266 A1 * | 4/2007 | Oh | 455/558 |

* cited by examiner

MOBILE TERMINAL WITH REDUCED COMPONENTS

The present invention relates to a mobile terminal having a first processing unit, a first memory device and a SIM card chip having a second memory device. Further it relates to a method for manufacturing a mobile terminal.

The invention relates in general to mobile terminals. There are different market segments for mobile terminals and different user groups. Mobile terminals used in the business area provide a lot of different functions, e.g. phoning, organizing, Internet access, email client, camera device, etc. It is obvious that these kind of mobile terminals are high price devices. The contrary low cost devices are used in the first place for phoning and maybe for messaging. However in most cases these low cost mobile terminals have the same architecture as used in high price mobile terminals, besides additional components such as cameras, which are not arranged in low cost mobile terminals.

In the following a general architecture of a mobile terminal will be described. A mobile terminal includes generally a transceiver unit, a display and a key pad. Further a digital signal processing unit is used for processing, encoding and decoding respective data. A main processing unit, also called base band processor, is controlling the operation and the interaction between components of the mobile terminal. Several non-volatile memory devices are arranged for storing different kinds of data. There is a boot memory for storing a boot or start-up sequence and security settings. A further non-volatile memory is a program memory for storing the operating system, application software and general fixed data, as tables etc. Further there is a SIM card having a SIM card chip, which includes a SIM card controller and a SIM card memory for storing network settings, the assigned phone number and user settings. A further non-volatile memory is used for storing individual mobile terminal specific data, which include parameters required to calibrate and set individual components of the individual mobile terminal. The main processing unit uses a volatile random access memory for storing temporary data. In most cases the non volatile memories for storing the individual mobile terminal specific data and the operating system and application software are realised as Flash memory devices. This common architecture is used in both low cost mobile terminals and high price terminals.

US 2003/0066881 A1 is related to a method for storing proprietary information in the SIM card of a mobile phone. It is described to store information of different manufactures on the SIM card.

Low cost mobile terminals are subject of a strong cost pressure, because they are mostly used as prepaid devices of a mobile radio network provider. A general challenge is to develop mobile terminals, which are smaller and faster and having less power consumption and reduced costs.

Therefore it is an object of the present invention to provide a mobile terminal and a method for manufacturing a mobile terminal having a simplified and cost reduced architecture resulting in a low price mobile terminal.

The object of the invention is achieved by the features stated in the enclosed independent claims.

Further advantageous implementations and embodiments of the invention are set forth in the respective sub claims.

The invention bases on the thought, that the kinds of data which are required for operating a mobile terminal could be divided into mobile terminal independent data, which are fixed before assembling or manufacturing the mobile terminal, and further into variable data to be set after assembling. This variable data comprises individual mobile terminal specific data, user and network specific data and security settings. The individual mobile terminal specific data are necessary to adjust e.g. parameters of components of the individual mobile terminal after manufacturing. Network specific data are used for operating the mobile terminal in a certain mobile radio network and user data comprises e.g. phone numbers and addresses.

The invention provides a mobile terminal having a first processing unit, a first memory device and SIM card chip having a second memory device. The first and second memory devices are embodied as non-volatile memories. The first memory device stores terminal independent data. These terminal independent data are stored before or during manufacturing of the mobile terminal. The variable data comprising individual mobile terminal specific data are stored in the second memory device. The second memory device is disposed on the SIM card chip. The individual mobile terminal specific data are stored after the assembling procedure, whereas the times for storing the further kinds of variable data are different. Further kinds of variable data are: network and user depending data, which are also stored in the second memory device. Since each mobile terminal comprises a SIM card having a SIM card chip in any case the SIM card chip including a controller and a memory device it is advantageously used as the second memory device for storing the individual mobile terminal specific data.

By assigning the different kind of data in this way the number of required non volatile memory devices is significantly reduced. A mobile terminal according to the represent invention requires only two different kinds of non-volatile memory devices. The first memory device includes data which are fixed before manufacturing of the mobile terminal. The second memory stores all kind of data which will be stored after manufacturing. The second memory allows the erasure and restoring of data. The storing of variable data, especially the individual mobile terminal specific data in the second memory located in the SIM card chip provides an improved protection of these data, since the data stored in the SIM card chip are further protected by the chip card controller. It is further advantageous to store the variable data in the second memory located in the SIM card chip, since there is a possibility to access these data via a SIM tool kit by an end to end communication via the mobile radio connection.

The terminal independent data include the operating system and application software, wherein it is not intended to change the operating system and application software during the lifetime of the mobile terminal. Especially in low cost mobile terminals, which are normally not used as long as high price mobile terminals, the need for upgrading the operating system or application software has a low priority. So these data are fixed before assembling the mobile terminal. Also the boot sequence and the fixed security settings are defined before assembling. So there is no need to store these kinds of data in high price EEPROM. According to the invention these data will be stored in the first memory device which is in particularly a read only memory device. These memory devices are cheaper and having a faster access time. A further advantage will be achieved by storing in particular the operating system and the application system in the same memory. This is an enhancement of the security, since these data are secured against any changes in respect to virus or other attacks. Alternatively a Flash memory could be used for storing terminal independent data.

A further reduction of memory requirements is achieved by storing the individual mobile terminal specific data in the second memory device. So the mobile terminal does not need to have any kind of further additional reprogrammable and erasable memory, because all variable data, which are determined after assembling or manufacturing could be stored on the second memory device, which is disposed in the SIM card chip.

A mobile terminal has to be calibrated after being assembled. For calibrating respective components of the mobile terminal certain values have to be measured and in dependency of the measured values calibration settings are performed. For instance the resonant circuits of the transmitting and receiving unit have to be tuned. Further correction settings of high frequency parts of the mobile terminal or default values, which are depending from the individual mobile terminal, needs to be set. Since the amount of data is very small, these data will be stored in the second memory device together with the network, user and identification data. This provides an improved security and the possibility to exchange data via an end to end communication.

By storing the individual mobile terminal specific data in the second memory device together with further user and network depending data the expenses for manufacturing such mobile terminal will be very low, because only one reprogrammable memory device is needed.

It is advantageous to arrange an interface unit. By using this interface unit there will be the possibility to store data in the second memory device after manufacturing.

The only requirement is that the SIM card chip containing the individual mobile terminal specific data needs to be assigned to the individual mobile terminal during manufacturing. The mobile terminal could only be operated in connection with this unique SIM card chip having the uniquely mobile terminal specific data of this mobile terminal. However, this disadvantage is not really disadvantageous, because in the low price area it is intended to bind the SIM card to the mobile terminal to force the user to use at least for a predetermined period the SIM card of a certain radio network provider.

It is advantageous to mechanically couple the individual SIM card to the mobile terminal during manufacturing, wherein the individual mobile terminal specific data will be stored during manufacturing in the second memory device, which is located on the SIM card chip. The mechanically coupling could be achieved by covering the SIM card by a hardly removable cover. So the SIM card is not accessible without removing the cover of the mobile terminal. So the manufacturer can store the individual mobile terminal specific data on the SIM card. The network provider and the user can access the second memory via the user interface or by using specific tools for removing the cover.

The mobile terminal having the second memory device located on the SIM card requires only the first memory device for storing boot sequence, operation system and application software. So in consequence a low price mobile terminal is provided having reduced components and costs and less power consumption.

In a further advantageous embodiment the mobile terminal does not have a SIM card. Instead of using a SIM card only the SIM card chip is used. The SIM card chip is coupled to the PCB of the mobile terminal. Data which are normally stored via a card reader on the SIM card will be stored via the interface unit in the erasable and programmable second memory device, located on the SIM card chip. By using this embodiment no mechanically coupling between the mobile terminal and the SIM card is required. This will save susceptible parts, e.g. the contacts for accessing the SIM card.

The object will also be solved by a method for manufacturing of a mobile terminal, wherein the mobile terminal comprises a first processing unit and a first memory device and a SIM card chip including a second memory, wherein terminal independent data are stored in the first memory device, the individual mobile terminal specific data, which needs to be provided after assembling or manufacturing of the mobile terminal are stored on the second memory device, which is an reprogrammable memory device, data which needs to provided after manufacturing for operating the mobile terminal are also stored on the second memory device.

The invention is described in detail below with reference to the accompanying schematic drawings, wherein.

Figure 1:
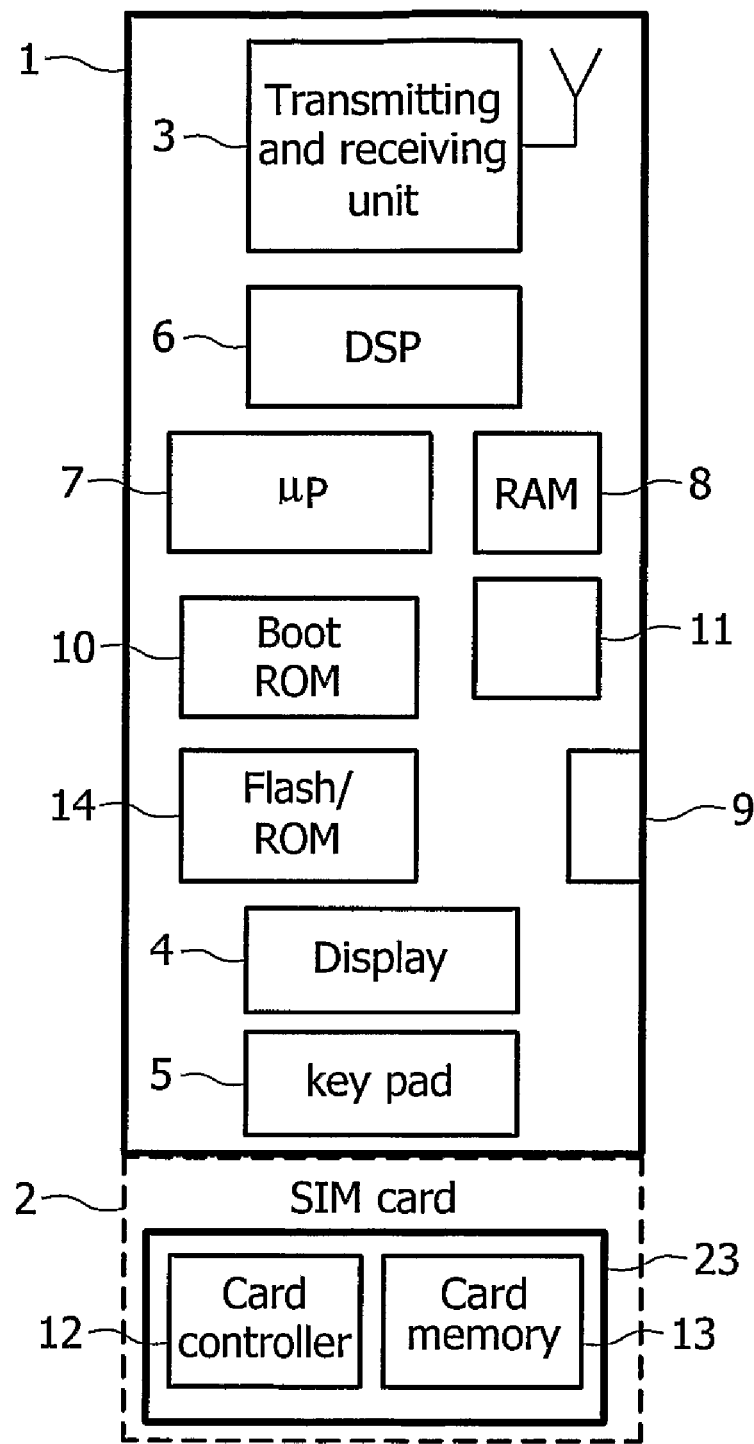
FIG. 1 shows a block diagram of a mobile terminal known from the prior art.

FIG. 1 represents a known mobile terminal 1. The mobile terminal 1 includes a transmitting and receiving unit 3 having an antenna for communicating with a base station and a digital signal processor DSP 6. A display unit 4 and a key pad 5 are arranged for providing a user interface. A first processing unit 7 is also called base band processor. It controls the operation of the mobile terminal and the interaction between components of the mobile terminal 1. The first processing unit 7 uses a RAM 8 for storing temporary data. The mobile terminal 1 uses a boot memory 10 for storing a boot sequence and fixed security setting. This boot memory 10 is a ROM. A further non-volatile memory is the program memory 14 for storing the operating system, application software and fixed data. This could be realised as ROM or Flash memory. A SIM card 2 is coupled via a card holder to the mobile terminal 1. Electrical contact areas (not shown) are provided on the SIM card 2 to access the data stored on the SIM card chip 23. The SIM card chip 23 comprises a card controller 12 and a card memory 13. The card controller 12 controls the data communication between the SIM card 2 and the first processing unit 7. The card memory 13 is located on the SIM card chip 23 for storing network settings, an own phone number and user settings. Individual mobile terminal specific data are stored in an EEPROM or Flash 11, which is located within the mobile terminal 1. This architecture shows the complexity of different non-volatile memory devices. In particularly up to four different non-volatile memory devices are used, thereby increasing the number of parts and costs.

Figure 2:
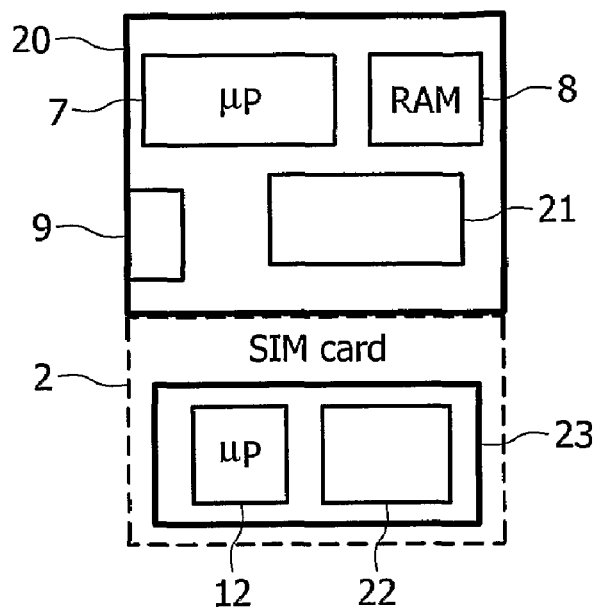
FIG. 2 shows a block diagram of a mobile terminal according the present invention.

A preferred embodiment of the present invention is illustrated in FIG. 2. The mobile terminal 20 incorporates also a SIM card 2 having a SIM card chip 23 including a card controller 12 and a second memory device 22. The first memory device 21 within the mobile terminal 20 is realised as a ROM memory or Flash memory. The first memory device 21 will be programmed before assembling the mobile terminal 20. The data to be stored in the first memory device 21 are fixed and independently from the individual mobile terminal 20. The operating system, application software, the boot sequence and fixed security settings will be stored in first memory device 21. These kinds of data will be the same for a certain model of a mobile terminal. In this inventive embodiment a first non-volatile memory is saved by combining the Boot ROM 1 (FIG. 1) and the program memory 14 (FIG. 1) and store the respective data together in the first memory device 21.

After assembling each mobile terminal 20 has to be adjusted and calibrated. Various measurements will be made, wherein depending on the measurements calibration of the high frequency parts could be performed. The calibration values, correction settings of high frequency parts or default values, which are depending from the individual mobile terminal. These individual mobile terminal specific data are stored in the second memory 22 located in the SIM card chip 23. Also the individual security settings (IMSI, IMEI) will be set. After storing these data the mobile terminal 20 could be distributed to the network provider. The network provider stores the respective network settings in the SIM card 2. It is further possible to store the network settings into the second memory 22 after assembling of the mobile terminal at the production site.

Then the mobile terminal 20 could be provided to the end user. The end user can store any individual user settings in the second memory 22. He has to be informed that the mobile terminal 20 could be operated only with this unique SIM card 2.

In comparison to the mobile terminal 1 known from the prior art represented in FIG. 1 the mobile terminal 20 represented in FIG. 2 has only two non-volatile memories—the first memory device 21 and the second memory device 22 on the SIM card 2.

To avoid a loss of the individual SIM card 2 it may be mechanically locked either after storing the individual mobile terminal specific data during manufacturing or after storing the network settings. This could be achieved by hiding the SIM card 2 using a cover (not shown), which could only be removed using special tools.

The mobile terminal 20 includes an interface unit 9. This interface unit 9 allows accessing the mechanically locked SIM card 2 by using a data cable or IR or Bluetooth communication. So a reprogramming of the SIM card memory 22 is possible, but the removal of the SIM card 2 is not possible. Further it is possible to access the data stored in the second memory 22 via an end to end communication using the mobile radio connection.

Figure 3:
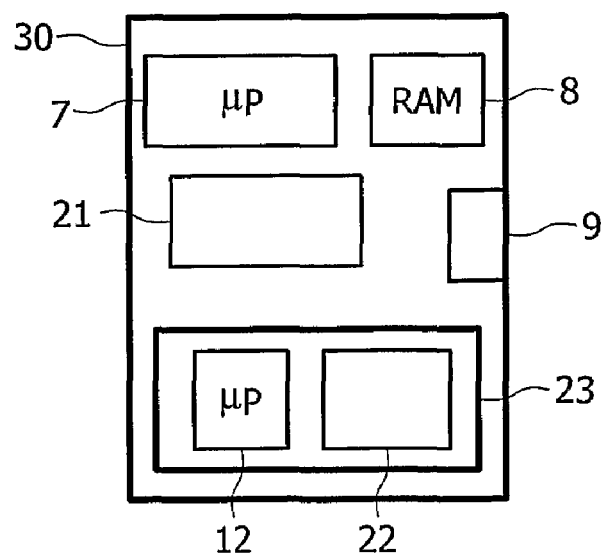
FIG. 3 shows a block diagram of an alternative embodiment of a mobile terminal according the present invention.

FIG. 3 shows an alternative embodiment of the present invention. In this embodiment a mobile terminal 30 is provided without a SIM card. The SIM card chip 23 is coupled to the PCB within the mobile terminal 30. The independent data are stored in the first memory device 21, whereas all data determined after assembling could be stored in the second memory device 22 which is located within the SIM card chip 23. This second memory device 22 is realised as EEPROM and could be accessed via the interface unit 9. So the individual mobile terminal specific data, the network settings, the identification settings and the user settings will be written into the second memory device 22 after assembling at the production site, at the distributor or by the end user. It is further possible to incorporate the second memory 22 into an integrated circuit of the mobile terminal 30 in a so called multi package chip (MCP), e.g. in the baseband controller, which is denoted as first processing unit 7.

By providing the inventive mobile terminal a simplified architecture is achieved, which reduces the components, costs and power consumption.

The invention claimed is:

1. A mobile terminal comprising:
 a first processing unit;
 a first memory device communicatively coupled to the first processing unit and having terminal independent data stored therein, wherein terminal independent data are stored therein during manufacturing of the mobile terminal; and
 a SIM card communicatively coupled to the first processing unit and including a second memory device, the second memory device is reprogrammable and has stored therein individual mobile terminal specific data that includes individual mobile terminal calibration values specific to at least one part of the mobile terminal, wherein individual mobile terminal specific data are stored in the second memory device after the mobile terminal is calibrated to be operatively functional and the mobile terminal calibration values are known.

2. The mobile terminal according to claim 1, wherein the second memory device has user-specific data and network specific data stored therein, and the second memory device is configured to store identification data.

3. The mobile terminal according to claim 1, wherein the first memory device is configured to store terminal independent data unchanged during a lifetime of the mobile terminal.

4. The mobile terminal according to claim 1, wherein the first memory device is realized as a read only memory (ROM) or as a Flash memory device and terminal independent data stored therein includes at least one of an operation system, application software, fixed data, start-up sequences or security settings.

5. The mobile terminal according to claim 4 wherein the mobile terminal is fully functionally operable in a post manufacturing state with only the first memory device and the second memory and does not require any other non-volatile memory device to fully operate after manufacturing.

6. The mobile terminal according to claim 5 wherein the mobile terminal includes the first memory device and the second memory device and no other non-volatile memory device.

7. The mobile terminal according to claim 1, wherein individual mobile terminal calibration values include at least one individual correction setting of the at least one part of the individual mobile terminal that is that is exterior to the SIM card and is specific to the individual mobile terminal, and comprising:
 at least one high frequency part that is external to the SIM card, and wherein the individual mobile terminal calibration values includes at least one calibration value for a respective setting of at the least one high frequency part of the mobile terminal.

8. The mobile terminal according to claim 1, further comprising:
 a second memory access device that accesses the second memory and changes data stored therein after manufacturing of the mobile terminal and that includes at least one of an interface unit or a mobile radio connection.

9. The mobile terminal according to claim 1, wherein the SIM card is assigned uniquely to only one mobile terminal during manufacturing, wherein the mobile terminal is only operateable with this SIM card having the uniquely individual mobile terminal specific data of this mobile terminal.

10. The mobile terminal according to claim 9, wherein the SIM card is mechanically coupled to the mobile terminal during manufacturing, wherein the individual mobile terminal specific data is stored in the second memory device during manufacturing of the mobile terminal.

11. The mobile terminal according to claim 1, wherein the SIM card including the second memory device is disposed on a printed circuit board or incorporated in an multi package chip of the mobile terminal, wherein all fixed operating data for operating the mobile terminal is stored in the second memory.

12. A method for manufacturing a mobile terminal, comprising:
 at least partially assembling a plurality of components that include at least a first processing unit and a first memory device into an individual mobile terminal that is at least partially functionally operative;

determining at least one individual mobile terminal calibration value for a correction of a respective setting of a respective component of the plurality of components;

storing terminal independent data that is independent of the at least partially assembled individual mobile terminal in the first memory device;

storing individual mobile terminal specific data in a second memory device of a first SIM card, the individual mobile terminal specific data including the at least one individual mobile terminal calibration value; and configuring the mobile terminal device to include the first SIM card such that the mobile terminal device is operable with only the first SIM card and inoperable with another SIM card.

13. The method of claim 12, farther comprising:

adjusting a respective component of the plurality of components based at least on the at least one individual mobile terminal calibration value for the respective component.

14. The method of claim 12, farther comprising:

connecting the SIM card to the mobile terminal; and mechanically locking the SIM card into the mobile terminal such that the SIM card ship is unmovable from the mobile terminal while mechanically locked therein.

15. The method of claim 12 wherein the plurality of components includes at least one high frequency component, and wherein determining at least one individual mobile terminal calibration value for a correction of a respective setting of a respective component of the plurality of components includes: measuring at least one characteristic of the at least one high frequency component and determining therefrom at least one individual mobile terminal calibration value for a correction of the at least one high frequency component; and further comprising:

adjusting the at least one high frequency component based at least on the at least one individual mobile terminal calibration value for the at least one high frequency component.

16. A mobile terminal comprising:

a first processing unit;

a first memory device that is one of a read only memory (ROM) or a Flash memory and that has terminal independent data including at least an operation system and start-up sequences stored therein, wherein terminal independent data are stored therein during manufacturing of the mobile terminal, and wherein the first memory device is electrically connected to the first processing unit;

a SIM card chip that is communicatively coupled to the first processing unit and that includes a second memory device, the second memory device is reprogrammable and has individual mobile terminal specific data stored therein, wherein individual mobile terminal specific data are stored in the second memory device after the mobile terminal is calibrated to be operatively functional; and at least one high frequency component calibrated specifically for the mobile terminal, and wherein second memory has at least one individual mobile terminal calibration value that sets the at least one high frequency component specifically for the mobile terminal stored therein;

wherein the first memory has application software, fixed data, and security settings stored therein, and wherein the mobile terminal is fully functionally operable in a post manufacturing state with only the first memory device and the second memory and does not require any other non-volatile memory device to fully operate after manufacturing;

wherein the mobile terminal includes the first memory device and the second memory device and no other non-volatile memory device.

17. The mobile terminal according to claim 16, comprising:

a SIM card that is assigned uniquely to only the mobile terminal during manufacturing and that includes the SIM card chip, wherein the mobile terminal is only operable with this SIM card chip; and a mechanical lock that locks the SIM card into the mobile terminal while the mechanical lock is a locked, wherein special tools are required to unlock the mechanical lock and remove the SIM card.

* * * * *